US009568758B2

(12) United States Patent
Suzuki

(10) Patent No.: US 9,568,758 B2
(45) Date of Patent: Feb. 14, 2017

(54) DISPLAY APPARATUS

(71) Applicant: DENSO CORPORATION, Kariya, Aichi-pref. (JP)

(72) Inventor: Isamu Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 26 days.

(21) Appl. No.: 14/761,637

(22) PCT Filed: Dec. 19, 2013

(86) PCT No.: PCT/JP2013/007452
§ 371 (c)(1),
(2) Date: Jul. 17, 2015

(87) PCT Pub. No.: WO2014/115226
PCT Pub. Date: Jul. 31, 2014

(65) Prior Publication Data
US 2015/0362789 A1 Dec. 17, 2015

(30) Foreign Application Priority Data

Jan. 23, 2013 (JP) ................................. 2013-010151

(51) Int. Cl.
*G02F 1/1333* (2006.01)
*G02F 1/1345* (2006.01)
(52) U.S. Cl.
CPC ..... *G02F 1/133308* (2013.01); *G02F 1/13452* (2013.01); *G02F 2001/133354* (2013.01)
(58) Field of Classification Search
CPC ............ G02F 1/133308; G02F 1/13452; G02F 2001/133334
See application file for complete search history.

(56) References Cited

U.S. PATENT DOCUMENTS 7,184,117 B2    2/2007 Suzuki
2005/0024573 A1    2/2005 Suzuki
(Continued)

FOREIGN PATENT DOCUMENTS

JP    H11143396 A    5/1999
JP    2000148031 A    5/2000
(Continued)

OTHER PUBLICATIONS

International Search Report and Written Opinion (in Japanese with English Translation) for PCT/JP2013/007452, mailed Mar. 11, 2014; ISA/JP.

*Primary Examiner* — Donald Raleigh
*Assistant Examiner* — Kevin Quarterman
(74) *Attorney, Agent, or Firm* — Harness, Dickey & Pierce, P.L.C.

(57) ABSTRACT

A display apparatus according to the present invention has a gasket attached in a space between a flexible print cable on which an electrically insulating coating is formed, the flexible print cable connecting the circuit board of a display panel and a connecting substrate connected to an external electric device, and a frame supporting a display unit including the display panel, the connecting substrate, and the flexible print cable. The gasket is provided with a core portion made of non-metal and having elasticity, and a surface portion made of metal disposed on a periphery of the core portion. By this means, unnecessary radiation noise generated from the flexible print cable connecting the display panel to the external electric device is effectively shielded without machining the display panel.

5 Claims, 7 Drawing Sheets

(56) References Cited

U.S. PATENT DOCUMENTS

2006/0040520 A1    2/2006  Moh
2006/0197718 A1*  9/2006  Yamate .................. H05K 1/148
                                                        345/37

FOREIGN PATENT DOCUMENTS

| JP | 2003330378 A | 11/2003 |
| JP | 2005049774 A | 2/2005 |
| JP | 2005274713 A | 10/2005 |
| JP | 2006058836 A | 3/2006 |
| WO | WO-2004093036 A1 | 10/2004 |

* cited by examiner (a) COMPARATIVE EXAMPLE (b) PRESENT EMBODIMENT

DISPLAY APPARATUS

CROSS-REFERENCE TO RELATED APPLICATIONS

This application is a U.S. National Phase Application under 35 U.S.C. 371 of International Application No. PCT/JP2013/007452 filed on Dec. 19, 2013 and published in Japanese as WO 2014/115226 A1 on Jul. 31, 2014. This application is based on and claims the benefit of priority from Japanese Patent Application No. 2013-010151 filed on Jan. 23, 2013. The entire disclosures of all of the above applications are incorporated herein by reference.

TECHNICAL FIELD

The present disclosure relates to a display apparatus.

BACKGROUND ART

A display apparatus used for, e.g., displaying a map of a car navigation device or displaying an image of television broadcasting, includes a liquid-crystal display panel, a backlight unit, a connecting substrate and an outer frame body housing the liquid-crystal display panel, the backlight unit, and the connecting substrate. The liquid-crystal display panel is constituted with two glass substrates and liquid crystal filled in a space between the two glass substrates. A circuit board on which a driver IC for the liquid-crystal display panel is disposed is provided on the glass substrate. The connecting substrate is connected to an external display controlling device. The circuit board and the connecting substrate are connected to each other through a flexible print cable on which an electrically insulating coating is formed.

A high frequency control signal is input into the liquid-crystal display panel through the flexible print cable. Thus, unnecessary radiation noise (electromagnetic wave) is generated from the flexible print cable. In Patent Literature 1 discloses a structure that shields the unnecessary radiation noise. That is, in Patent Literature 1, the flexible print cable is covered by a gold film for shielding and the gold film is electrically connected to an outer frame body made of metal. The outer frame body to which the gold film is connected is relatively large-sized and has a large surface area. Therefore, the unnecessary radiation noise generated from the flexible print cable is absorbed by the gold film and flows toward the outer frame body.

PRIOR ART LITERATURE

Patent Literature

Patent Literature 1: JP 2005-49774 A

SUMMARY OF THE INVENTION

However, in the above-described conventional technology, the flexible print cable needs to be covered by, e.g., the gold film with respect to the display panel. Furthermore, additional working processes, such as connecting the gold film to the outer frame body or removing a portion of the coating for the flexible print cable, may be required.

In view of the above, it is an object of the present disclosure is to provide a display apparatus that can effectively shield unnecessary noise generated from a flexible print cable that connects a display panel to an external electric device without machining the display panel.

In the display apparatus of the present disclosure, an elastic member is disposed in a space between a flexible print cable, on which an electrically insulating coating is formed and which connects a circuit board of a display panel to a connecting substrate connected to an external electric device, and a frame, which is made of metal and supports a display unit including the display panel, the connecting substrate and the flexible print cable. The elastic member includes a core portion, which is made of non-metal and has elasticity, and a surface portion, which is made of metal and is disposed on a periphery of the core portion.

According to the configuration, the elastic member is suitably pressure-bound by the flexible print cable and the frame, and an imaginary capacitor, which includes a wiring pattern, as a first metallic plate, on the flexible print cable, an electrically insulating coating, as a dielectric, covering the flexible print cable, and the surface portion, as a second metallic plate, of a gasket, is formed. Further, radiation noise generated from the flexible print cable is a high frequency wave. Thus, the flexible print cable and the frame are connected to each other by so-called capacity coupling. As a result, the radiation noise generated from the flexible print cable can be absorbed by the imaginary capacitor and then the radiation noise can flow toward the frame. This configuration can be realized by attaching the elastic member in the space between the flexible print cable and the frame, whereby there is no need to machine the display panel. Therefore, the unnecessary radiation noise generated from the flexible print cable connecting the display panel and the external electric device can be effectively shielded without machining the display panel.

EMBODIMENTS FOR CARRYING OUT INVENTION

Figure 1:
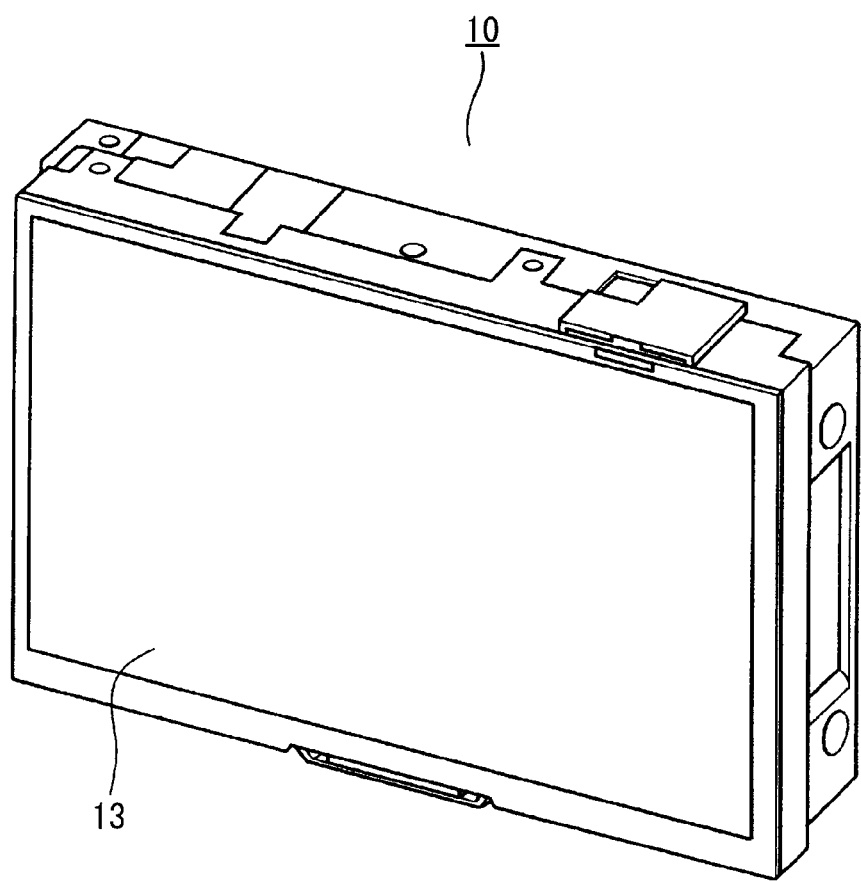
FIG. 1 is a perspective view illustrating an external appearance of a display apparatus according to an embodiment.
Figure 2:
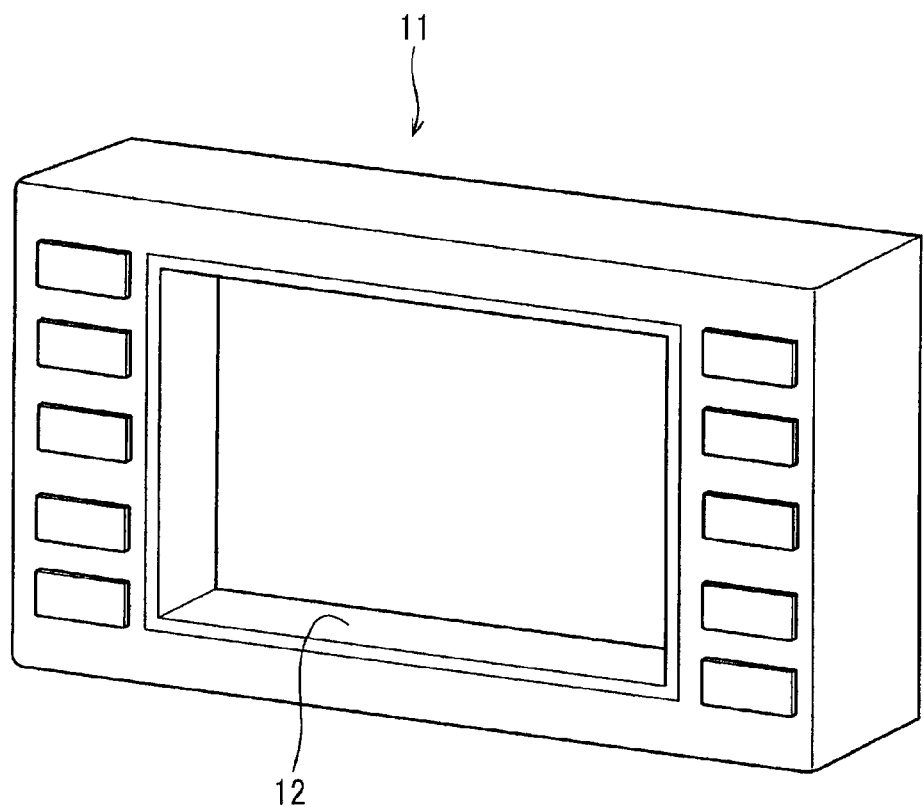
FIG. 2 is a perspective view illustrating an external appearance of a vehicle on-board device.
Figure 3:
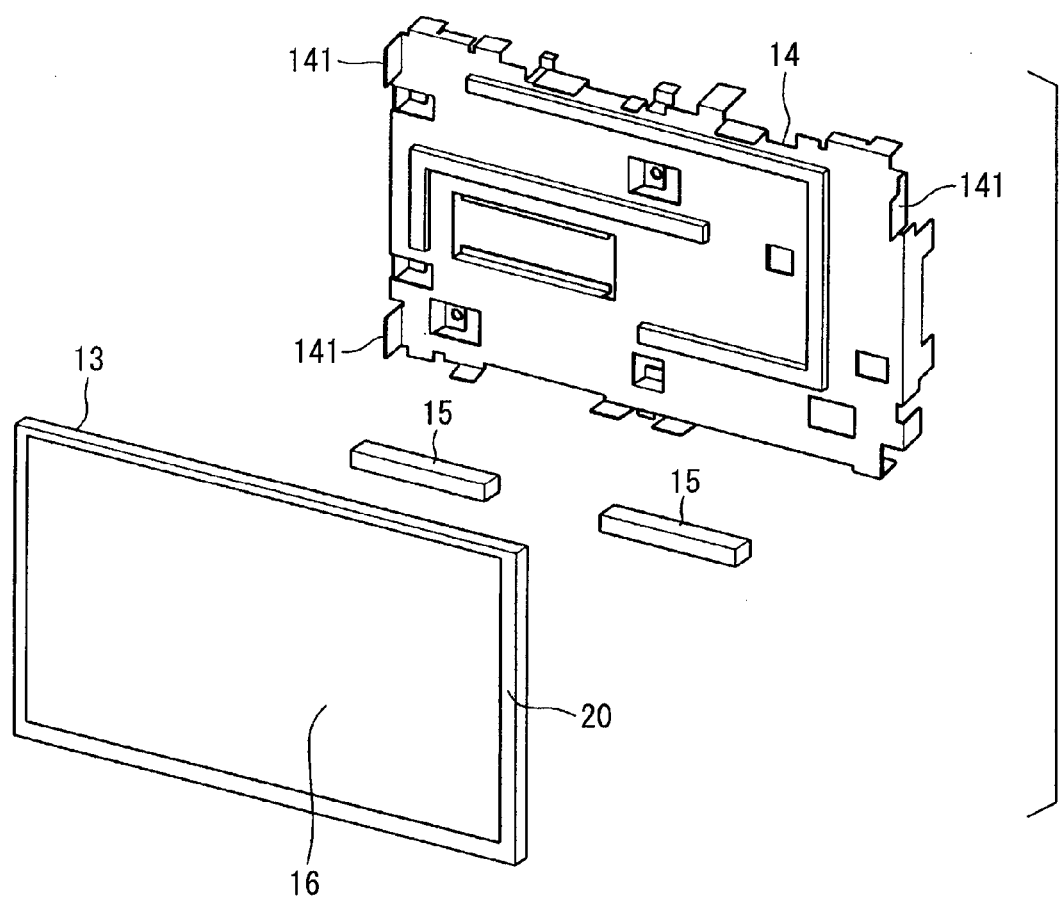
FIG. 3 is an exploded perspective view illustrating the display apparatus.
Figure 4:
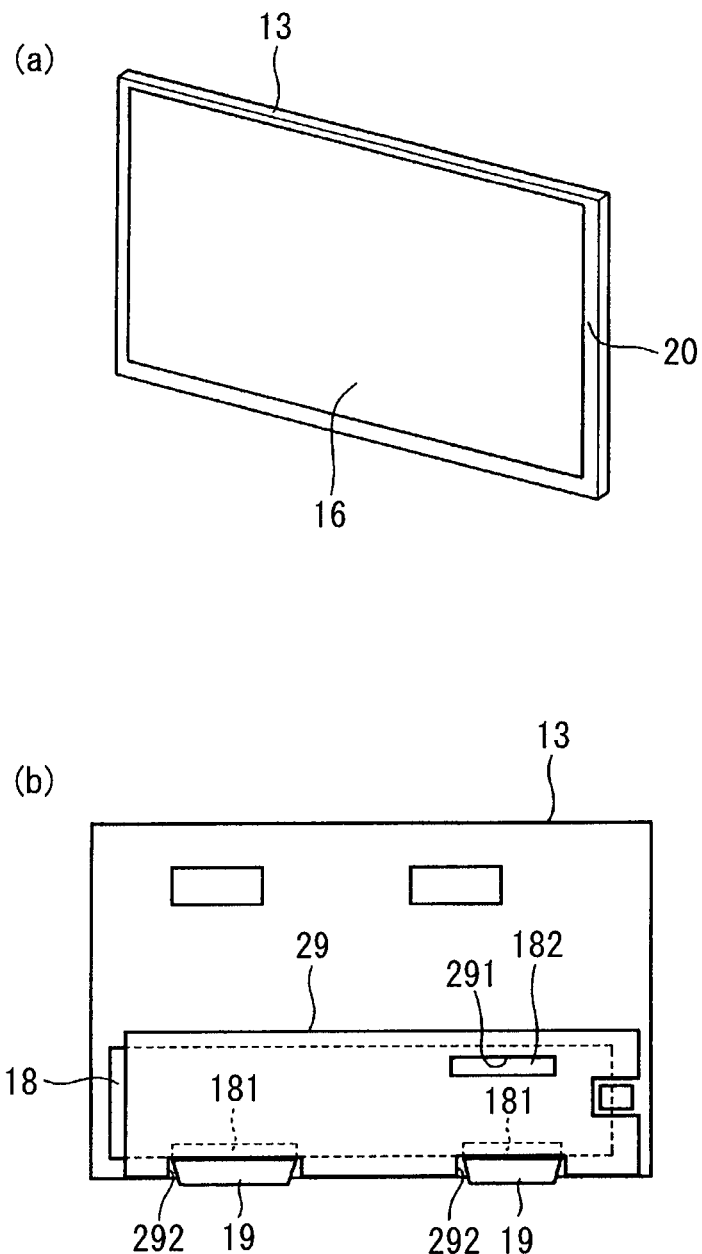
FIG. 4 (a) is a perspective view illustrating a display unit and FIG. 4 (b) is a rear view illustrating the display unit.
Figure 5:
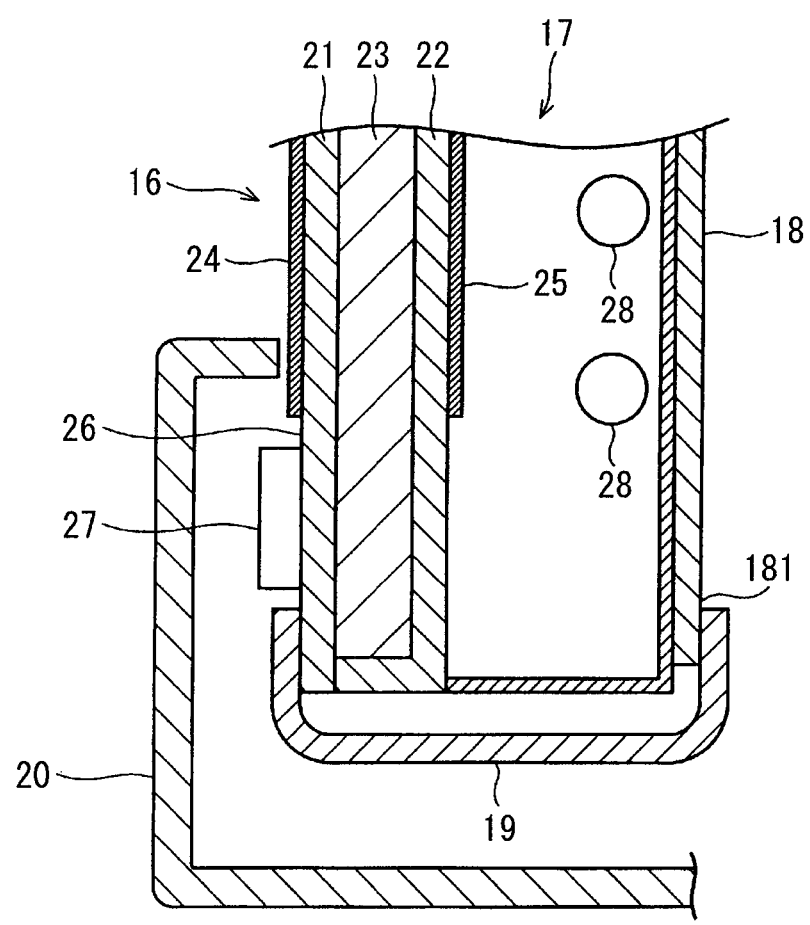
FIG. 5 is a cross-sectional view illustrating a lower portion of the display unit.

Hereinafter, an embodiment of the present disclosure will be described with reference to the drawings. A display apparatus 10 shown in FIG. 1 is disposed in a car navigation device mounted to, e.g., a vehicle and is attached inside, for example, a storage container 12 of a main body 11 as shown in FIG. 2. As illustrated in FIG. 3, the display apparatus 10 includes a display unit 13, a frame 14, a gasket 15 or the like. As shown in FIGS. 4 and 5, the display unit 13 includes a display panel 16, a backlight unit 17, a connecting substrate 18, flexible print cables 19 (hereinafter, "FPC 19") or the like.

The display panel 16 and the backlight unit 17 are housed inside an outer frame body 20, which is made of a metallic plate such as a steel plate, in a state where the display panel 16 and the backlight unit 17 are stacked with each other. The display panel 16, which is arranged at a front position of the outer frame body 20, is formed of two glass substrates 21, 22, which are two transparent substrates, and a liquid-crystal 23, which is filled in a space between the two glass substrates 21, 22. Polarization plates 24, 25 are disposed respectively in portions of a front surface of the front-side glass substrate 21 and a rear surface of the rear-side glass substrate 22, each of which serves as a display region. A circuit board 26 is disposed in a periphery portion of the front surface of the front-side glass substrate 21, i.e., an outside portion of the display region, among the two glass substrates 21, 22. A circuit pattern not illustrated is formed on the circuit board 26. A plurality of driver ICs 27 (electrical components), which are electrical components for a driver of the display panel 16, are disposed on the circuit substrate 26. The backlight unit 17 arranged in a rear side of the outer frame body 20 includes a light sources 28 inside the backlight unit 17 and a power cable, not illustrated, for supplying power to the light source.

In this case, the connecting substrate 18 is attached to a back surface side of the outer frame body 20, i.e., a surface of the outer frame body 20 opposite to a front surface on which the circuit board 26 is disposed. As shown in FIG. 4 (b), the connecting substrate 18 includes connecting portions 181 for the flexible print cable and the FPC 19 is connected to each connecting portion 181. In the present embodiment, a plurality of, more specifically, two of, connecting portions 181 are provided. Further, the connecting substrate 18 includes a connector 182 for an external device and the connector 182 is connected to a non-illustrated display control device that is an external electric device. The display control device inputs and outputs, through the connecting substrate 18, a control signal for controlling a display output of the display apparatus 10.

The FPC 19 is formed of a multilayer board that is formed by laminating, e.g., a plurality of print boards, which is made of a plastic film and has flexibility. An electrically insulating coating 191 (refer to FIG. 7) is applied substantially entirely to the FPC 19. In the present embodiment, a plurality of, more specifically, two of, the FPCs 19 are provided to correspond to the number of the connecting portions 181. As shown in FIG. 5, each FPC 19 is connected to the circuit board 26 by, e.g., soldering one end of the FPC 19. The other end of the FPC 19 is connected to the connecting portion 181 by, e.g., soldering. Accordingly, the FPC 19 connects the circuit board 26 to the connecting substrate 18 in a state where the FPC 19 is bent into a substantially U-shaped cross-section at a lower end of the display unit 13. It should be noted that the electrically insulating coating 191 is applied substantially entirely to the FPC 19 except connecting portions for the circuit board 26 and the connecting substrate 18. Further, a plurality of wiring patterns (e.g., a signal line formed of a copper wire) connecting a circuit pattern of the circuit board 26 to the connecting substrate 18 are formed in the FPC 19.

As shown in FIG. 4 (b), a cover film 29, which is made of, e.g., a plastic film and has electrical insulation property, is attached to a back surface of the display unit 13. The cover film 29 substantially entirely covers the connecting substrate 18 except the connector 182 or the like. An opening 291 is formed in the cover film 29 and the connector 182 is inserted into the opening 291. Thus, the connector 182 is not covered by the cover film 29 and is exposed to an outside. A plurality of, more specifically, two of, notched portions 292, which correspond to the number of the FPCs 19, are formed in the cover film 29. A portion of the FPC 19, which is positioned at a side of the back surface of the display unit 13, in other words, which faces the frame 14, is inserted into the notch portion 292. Therefore, the portion of the FPC 19 that faces the frame 14 is not covered by the cover film 29 and is exposed to an outside.

As shown in FIG. 3, the frame 14 is a member made of metal and formed into a rectangular shape. A plurality of fixing portions 141 are formed on an edge of the frame 14. The display unit 13 is fixed to the fixing portions 141 by, e.g., screw. Thus, the display unit 13 is supported by the frame 14. When the display unit 13 is supported by the frame 14, a space is formed between the display unit 13 and the frame 14. The gasket 15 is interposed in the space. In the present embodiment, the space having about 6 mm is formed between the display unit 13 and the frame 14.

Figure 6:
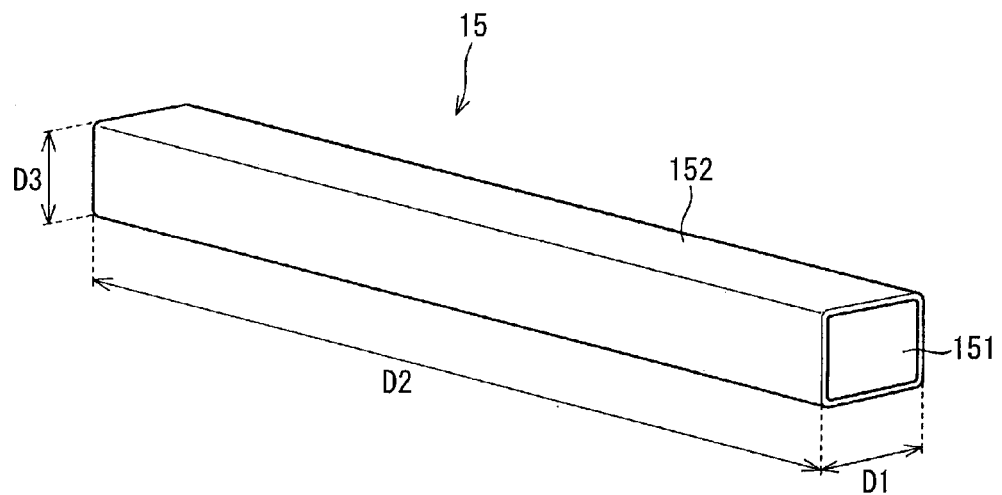
FIG. 6 is a perspective view illustrating an external appearance of a gasket.

As shown in FIG. 6, the gasket 15, which corresponds to an elastic member, includes a core portion 151 having elasticity (cushioning property) and made of non-metal, and a surface portion 152 made of metal and disposed on a periphery of the core portion 151. The core portion 151 is formed of a member, such as a sponge, which provides electrical insulation and has elasticity. The surface portion 152, in this case, is formed of a metallic mesh sheet, which is formed of a plurality of metallic wires into a meshed form. Therefore, the surface portion 152 has flexibility. The surface portion 152 is deformed, together with the core portion 151, according to the deformation of the core portion 151. The surface portion 152 may be formed of, e.g., a metallic film as far as the surface portion 152 has flexibility.

The gasket 15 has a thickness greater than the size of space between the display unit 13 and the frame 14 before the gasket 15 is attached in the space between the display unit 14 and the frame 14. As shown in FIG. 6, in the present embodiment, the thickness D1 of the gasket 15 (i.e., the dimension along a depth direction of the display apparatus 10) before being attached is set to about 7 mm. When the gasket 15 is attached in the space between the display unit 13 and the frame 14, the gasket 15 is compressed by being interposed between the display unit 13 and the frame 14 and is closely in contact with the FPC 19 and the frame 14. In this case, the gasket 15 is compressed by about 1 mm to 2 mm in a thickness direction.

The gasket 15 is formed to have a dimension D2 in a longitudinal direction (i.e., a length along a lateral direction of the display apparatus 10) greater than the width of the FPC 19. In this case, the dimension D2 in the longitudinal direction of the gasket 15 is set to about 30 mm. The gasket 15 is formed to have a dimension D3 in a vertical direction (i.e., a dimension along a vertical direction of the display apparatus 10) that is greater than a dimension of the notched portion 292 in a vertical direction. In this case, the dimension D3 in the vertical direction of the gasket 15 is set to about 5 mm. Thus, the entire portion of the FPC 19, which is exposed from the notched portion 292 at a back surface side of the display unit 13, is covered by the gasket 15 that is attached. It should be noted that the dimension D2 in the longitudinal direction and the dimension D3 in the vertical direction of the gasket 15 may vary according to the deformation of the gasket 15 when the gasket 15 is attached, compared to the dimensions D2 and D3 before the gasket 15 is attached.

In the above-described display apparatus 10, a high frequency control signal flows through the wiring pattern (signal line) of the FPC 19. Thus, unnecessary radiation noise is generated from the FPC 19. To shield the radiation noise, the gasket 15 is disposed between the display unit 13 and the frame 14 and the gasket 15 is in closely contact with both the FPC 19 and the frame 14.

Figure 7:
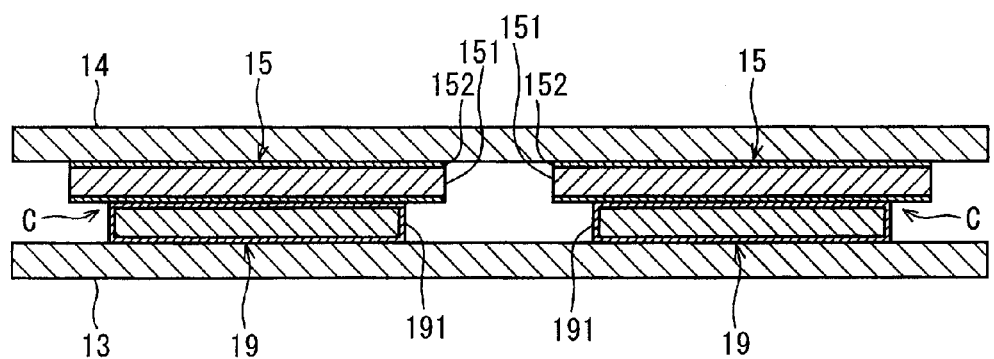
FIG. 7 is a transverse cross-sectional view illustrating the display unit.

According to this configuration, the gasket 15 is suitably pressure-bound by the FPC 19 and the frame 14. Therefore, as shown in FIG. 7, an imaginary capacitor C, which includes the wiring pattern on the FPC 19 as a first metallic plate, the electrically insulating coating 191 covering the FPC 19 as a dielectric, and the surface portion 152 of the gasket 15 and the frame 14 as a second metallic plate, is formed. Further, the radiation noise generated from the FPC 19 is a high frequency wave. Thus, the FPC 19 and the frame 14 are connected to each other by so-called capacity coupling through the imaginary capacitor C. As a result, the radiation noise generated from the FPC 19 can be absorbed by the imaginary capacitor C and flow toward the frame 14.

The configuration of the display apparatus 10 of the present embodiment can be realized by attaching the gasket 15 in the space between the FPC 19 and the frame 14. Thus, there is no need to machine the display panel 16 by, e.g., covering the FPC 19 with a metallic film, connecting the metallic film to the outer frame body 20, removing a portion of the coating 191 of the FPC 19, or the like. Therefore, unnecessary radiation noise generated from the FPC 19 connecting the display panel 16 to the display control device (the connecting substrate 18) can be effectively shielded without machining the display panel 16.

Further, the gasket 15 has the thickness greater than the size of the space between the display unit 13 and the frame 14 before the gasket 15 is attached and the gasket 15 is compressed to be in closely contact with the FPC 19 and the frame 14 when the gasket 15 is attached. Accordingly, the imaginary capacitor C can be surely formed and the shielding effect for the unnecessary radiation noise can be further improved.

The FPC 19 has the exposed portion that faces the frame 14, and the gasket 15 covers the exposed portion of the FPC 19. Hence, the gasket 15 is sufficiently in contact with the FPC 19, and thus the imaginary capacitor C can be surely formed and the shielding effects for the unnecessary radiation noise can be further improved.

The gasket 15 is formed to have the dimension in the longitudinal direction that is greater than the width of the FPC 19. Thus, it is possible to sufficiently secure a contact area of the gasket 15 that is in contact with the FPC 19, whereby the imaginary capacitor C can be surely formed and thus the shielding effect can be further improved.

The surface portion 152 of the gasket 15 is formed of a metallic mesh sheet or a metallic film and has flexibility. Therefore, when the gasket 15 is pressure-bound, the surface portion 152 is properly deformed to be in contact with the FPC 19, whereby the imaginary capacitor C can be surely formed and thus the shielding effect can be further improved.

Figure 8:
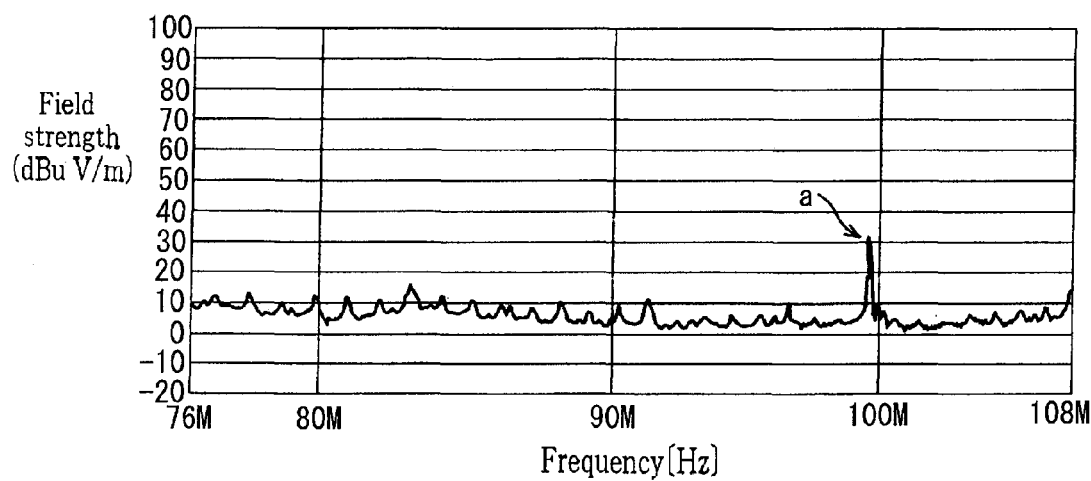
FIG. 8 is a diagram showing a result of a comparative experiment for shielding effects.
Figure 8:
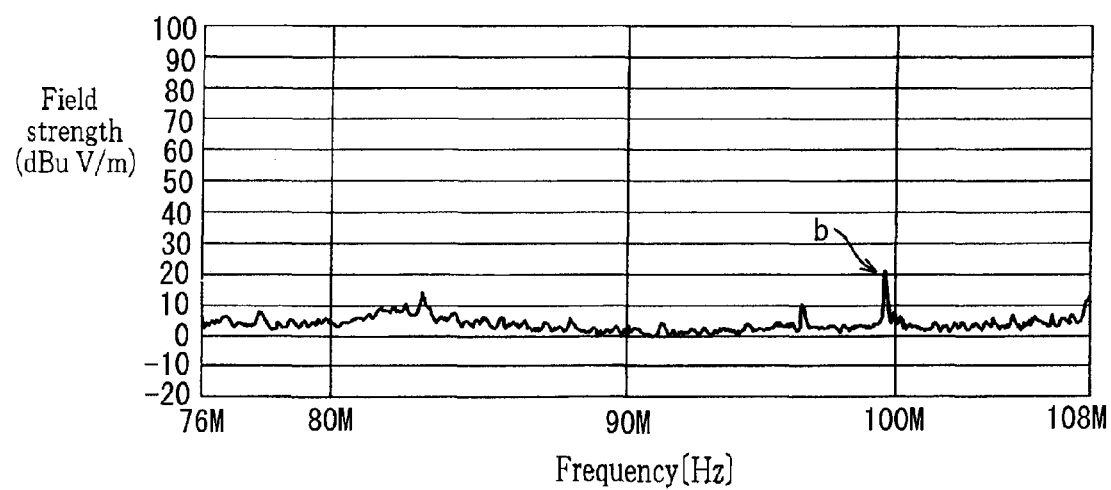

FIG. 8 shows the result of an electric field intensity, which was measured to confirm the effects of the present embodiment, while the frequency of a signal to the FPC 19 being varied regarding the display apparatuses of the present embodiment and a comparative example. FIG. 8 (a) illustrates a measured result of the electric field intensity of the comparative example, and FIG. 8 (b) illustrates a measured result of the display apparatus according to the present embodiment. As FIG. 8 indicates, the radiation noise of the display apparatus according to the present embodiment is reduced compared to the comparative example. For example, at 99 MHz, the comparative example has about 31 dBµV/m (refer to the reference symbol a), while the display apparatus according to the present embodiment has about 21 dBµV/m (refer to the reference symbol b). In other words, in comparison with the comparative example, the reduction of about 10 dBµV/m for the radiation noise can be achieved according to the display apparatus of the present embodiment.

Furthermore, according to the display apparatus of the present embodiment, the reduction effects increase at, especially, the range of 88 to 108 MHz, which is a frequency band for FM broadcasting. The high frequency control signal (i.e., dot clock) having about 33 MHz flows through the FPC 19. In addition to the car navigation device, a radio receiver, a TV receiver, or the like are also disposed inside or close to the main body 11. A third harmonic wave of the above control signal (i.e., about 99 MHz) interferes with the frequency band for the FM broadcasting (about 88 to 108 MHz). However, the display apparatus of the present embodiment has the increased reduction effects for the radiation noise at, especially, the range of 88 to 108 MHz, thereby providing noise prevention effects for the FM broadcasting.

Further, a RGB image signal flowing through the FPC 19 includes a substantially one-half harmonic wave (i.e., about 16 MHz) of the above control signal (i.e., dot clock), and a sixth harmonic wave (i.e., about 96 MHz) interferes with the frequency band for FM broadcasting. However, since the present embodiment has the large reduction effects for the radiation noise at, especially, 88 to 108 MHz, the noise prevention effects for the FM broadcasting is provided.

It should be noted that the above-described about 33 MHz is one example of the dot clock when the display apparatus 10 has a resolution of about 800 by 480 dots. The dot clock has a frequency according to the resolution of the display apparatus 10. Therefore, if the display apparatus 10 has a high resolution, the dot clock has also a high frequency, whereas if the display apparatus 10 has a low resolution, the dot clock has also a low frequency.

The present disclosure should not be only limited to the above embodiment, and the present disclosure can be applied to a variety of embodiments within the scope of the gist thereof. For example, the shape or the size of the gasket 15 may vary according to, e.g., the shape or the size of the FPG 19. Further, the number of the gaskets 15 to be attached can vary according to, e.g., the number of the FPC 19.

Further, the FPC 19 may be a flat cable. The circuit board 26, which is disposed outside of the display region of the display panel 16, may be disposed on a substrate other than the glass substrate 21. Furthermore, electric components forming the display control device may be mounted to the circuit board 26. In this case, since a reference clock circuit and a power supply circuit are disposed in an outside, the FPC 19 is connected to the clock circuit and the power supply circuit, as an external device. The circuit board 26 may be formed on the rear-side glass substrate 22 or both the glass substrates 21, 22.

The circuit board 26 may be formed in the display region and invisible-small electric components may be mounted to the circuit board. The circuit substrate and the electric components may be disposed inside the glass substrates. The display panel is not only limited to the liquid-crystal display panel, and the display panel may be an EL panel (EL: Electro Luminescent) or a FED panel (FED: Field Emission Display).

What is claimed is:

1. A display apparatus comprising:

a display unit including a display panel having a circuit board on which an electric component is disposed, a connecting substrate connected to an external electric device, and a flexible print cable on which an electrically insulating coating is formed, the flexible print cable connecting the circuit board to the connecting substrate;

a frame made of metal and supporting the display unit; and an elastic member including a core portion, which is made of non-metal and has elasticity, and a surface portion, which is made of metal and is disposed on a periphery of the core portion, the elastic member being in contact with the flexible print cable and the frame.

2. The display apparatus according to claim 1, wherein the elastic member has a thickness that is greater than a size of a space between the display unit and the frame before the elastic member is attached, and the elastic member is compressed to be closely in contact with the flexible print cable and the frame after the elastic member is attached.

3. The display apparatus according to claim 1, wherein the flexible print cable has an exposed portion that faces the frame, and the elastic member covers the exposed portion of the flexible print cable.

4. The display apparatus according to claim 1, wherein the elastic member is formed to have a length in a longitudinal direction that is longer than a width of the flexible print cable.

5. The display apparatus according to claim 1, wherein the surface portion is a metallic mesh sheet or a metallic foil and has flexibility.

* * * * *